United States Patent [19]

Hopkins

[11] 4,292,931

[45] Oct. 6, 1981

[54] METHOD AND MEANS FOR HOLDING A SHEEP

[75] Inventor: Donald L. Hopkins, Heywood, Australia

[73] Assignee: Alf Hannaford & Co. Pty. Ltd., Beverley, Australia

[21] Appl. No.: 127,756

[22] Filed: Mar. 6, 1980

[30] Foreign Application Priority Data

Mar. 7, 1979 [AU] Australia .............................. PD7941

[51] Int. Cl.³ ........................ A61D 3/00; A01K 15/00

[52] U.S. Cl. ................................................... 119/103

[58] Field of Search ...................... 119/103, 96, 98, 99

[56] References Cited

U.S. PATENT DOCUMENTS

| | | | |
|---|---|---|---|
| 644,313 | 2/1900 | Anderson | 119/103 |
| 1,178,933 | 4/1916 | Macdonald | 119/103 |
| 2,829,622 | 4/1958 | Borthwick | 119/103 |

FOREIGN PATENT DOCUMENTS

| | | | |
|---|---|---|---|
| 496451 | 6/1977 | Australia | 119/103 |

*Primary Examiner*—Hugh R. Chamblee

*Attorney, Agent, or Firm*—Oldham, Oldham, Hudak & Weber, Co.

[57] ABSTRACT

The method of handling sheep which includes the steps of locating a sheep on apparatus as set out in any one of the preceding claims and including the steps of firstly locating the sheep on the table on its back and immobilizing the sheep while in this position by urging the yoke against its rear portion at a location between jointly its rear legs and its body, then removing the said yoke from an engaging position against the sheep, rolling the sheep over onto its side and bringing together the two said members whereby to hold the front legs and the back legs at a location adjacent an upper end of each leg where this adjoins the body by having a "U" shaped space encompass the front and rear legs respectively, and then rolling the sheep over while its legs are so retained so that it eventually rolls to be fully supported on the restraining means holding its four legs and then pulling the two members apart so as to release the sheep.

6 Claims, 5 Drawing Figures

METHOD AND MEANS FOR HOLDING A SHEEP

Figure 1:
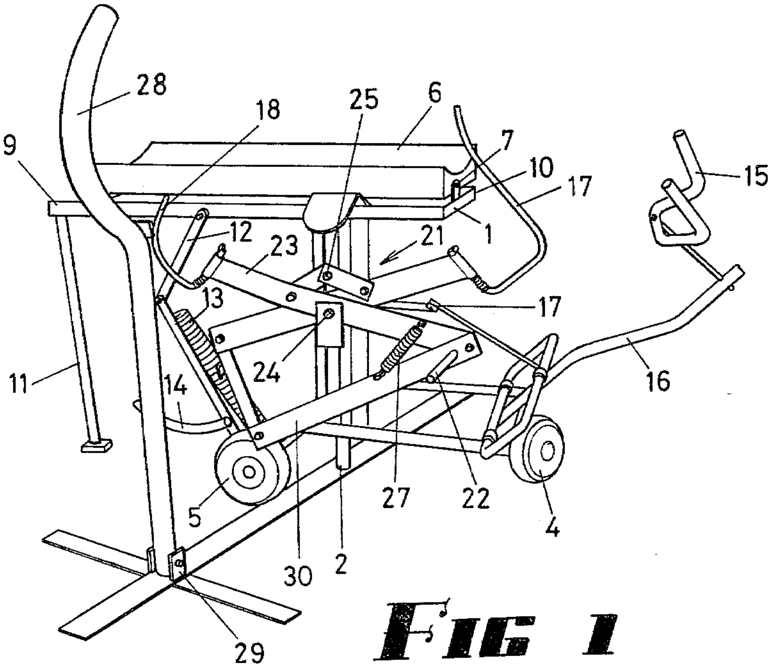

This invention relates to the handling of sheep and apparatus particularly adapted for the purpose of holding sheep during a shearing operation.

The problems to which this invention is directed are now extremely well known and of significant consequence to the economy of several countries in the world.

It is well known that it is both a difficult and arduous job to shear sheep and this is especially the case insofar that during the shearing operation the sheep must normally be held at the feet of the shearer.

This means of course that the shearer must be bending over and it is well known that shearing requires substantial support from the shearer's back so that many shearers are unable to continue after a period of time because of the strain imposed upon their back.

Many previous attempts have been made to provide holding means for a sheep while the sheep is being sheared.

Among these are special tables with clamps to hold each of the legs of the sheep.

While to some extent some of these have had a limited application, they have not generally been accepted because it takes considerable time to locate the sheep in the apparatus which in itself considerably lessens the value of the apparatus as such and secondly any apparatus must be such that the sheep is held in such a way that the animal is either comfortable so that it will not unduly struggle or is held in such a way that such struggling will not be disadvantageous to the shearing operation.

It is for this reason generally that the preferred manual holding of the sheep by a shearer generally between his legs has been preferred.

Nonetheless, because of the severe strain imposed upon the back of a shearer and perhaps merely because it is a very physically demanding task, there is significant value in discovering a method and apparatus by which a sheep can be held which can be applied in a minimum of time to the sheep and which generally will hold sheep so that struggling of the sheep will be reduced to a minimum and in any event such struggling will not unduly affect the shearing operation.

This invention then relates to a method and apparatus for holding of sheep especially suitable for holding sheep at an elevation so as to assist in the operation of shearing.

The apparatus and method is also suitable for holding of sheep for any other operation that might necessarily be required to be performed on the sheep.

Perhaps according to one form of this invention, although this need not be the broadest or only form of the invention, there is an apparatus including a table adapted to support a sheep in a first instance on its back and subsequently to be rolled over on its side, means during the first stage to push the rear legs of the sheep while on its back forwardly into its body so as to restrain its movements during such position, means located to a side of the table and adapted to engage both the front and rear legs and hold these by engagement close to the body of the sheep and adapted so that the sheep while being maintained in the condition of having its legs held, pushed together close to its body can nonetheless be turned over so as to be on its side and eventually upright although restrained by its holding of the legs, and means to release such holding of the sheep.

In another form, the invention could be said to reside in apparatus for the holding of sheep for purposes such as shearing the apparatus being characterised by including a frame, a table support on the frame and adapted to support a sheep in a prone situation on the table, a yoke adjustably supported relative to the table and adapted to selectively engage against a rear of a sheep when this is lying on its back on the table so as to push against the sheep across the location between jointly the rear legs and the body of the sheep, and, to one side of the table, two members, each with a "U" shaped space the open end of one "U" shaped space adjacent the open end of the other "U" shaped space, the location of each "U" shaped space being such that each will engage respectively and jointly the front legs or in the other case, the rear legs of the sheep so as to hold these, at a location generally at an upper end of each leg and the body of the animal, the said two members being adjustably supported relative to the table so that in one position, the legs of the animal will be held with the animal on its side lying on the table, and, in a second position, the animal will be supported fully in an upright position by such members while its legs are still held by the said members.

It is preferred that the two said members are movable relatively one to the other and preferably such that these can be moved apart so as in the first instance to allow an animal to be free after being held by the members or in the further instance being engaged by bringing the otherwise separate members together to thereby engage the "U" shaped spaces in each case around the respective portions of the legs.

A further preferred feature is that the table is supported relative to its frame supporting it such that it can be inclined relative to a horizontal support base whereby to tilt a supported sheep in a first position such that the head of the animal is higher than its rear portion when this is against the said yoke.

The concept in perhaps another form can be said to reside in means providing for the restraining of the sheep in such a way that access to the full body can be progressively obtained through the rotating of the sheep from an "on the back" position to an "on the side" position and eventually to an upright position. Preferably the means engaging the forward and rearward legs of the sheep for a subsequent holding action and at least to a certain extent holding these close to one another at a location near the body of the sheep or at least adapted to do so comprise two "U" shaped members supported in such a way as to be able to be easily brought together and to be held in a closer position adequate for controlling the selected sheep and the "U" shape coming together and to be held in a closer position adequate for controlling the selected sheep and the "U" shaped members are each held in such a way as to be able to be pivotally shifted in position the pivot axis being in general terms about a horizontal orientation or approximately horizontal.

Preferably there are some means to assist in holding the sheep in the restraining condition imposed by the "U" shaped members especially when the sheep is at or toward an upright position and accordingly there is a further restraining member having an adaptedly movable position in one position of which however it is such as to limit the lifting of the sheep from the restraining "U" shaped members especially when the sheep is in the generally upright position.

The location of the respective members is generally in from a holding position.

Figure 1A:
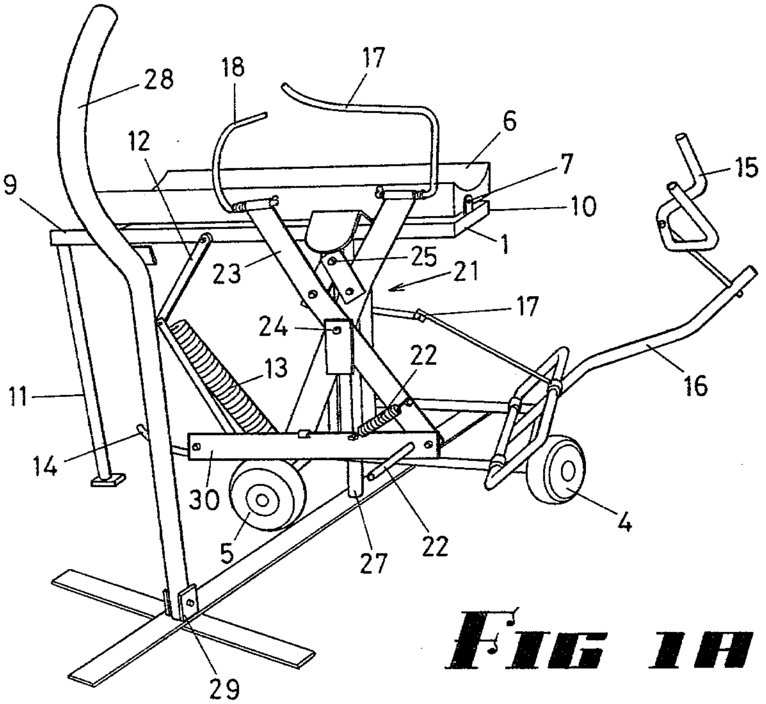
Figure 2:
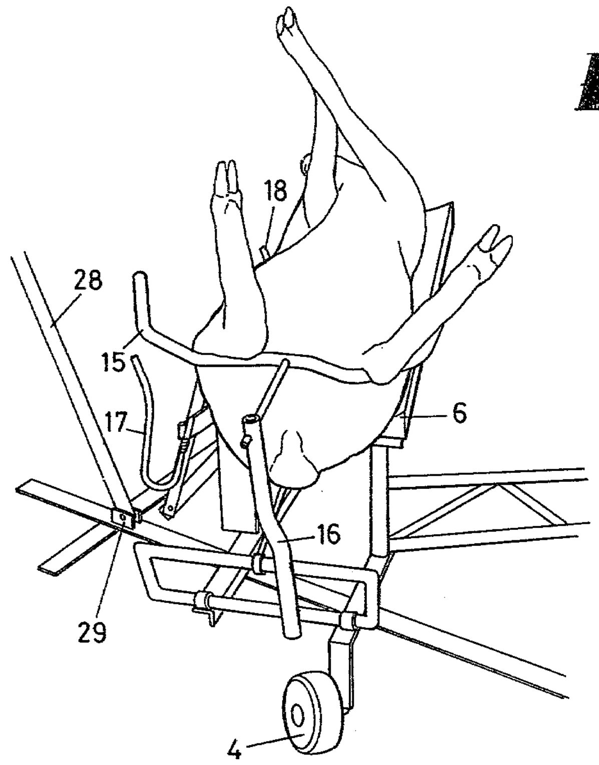
Figure 3:
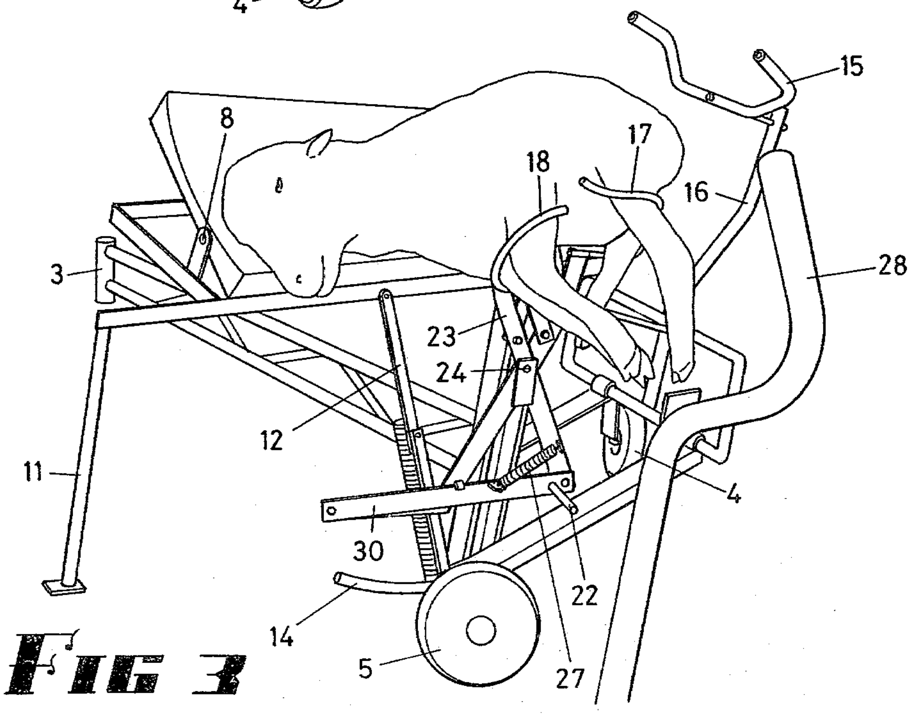
Figure 4:
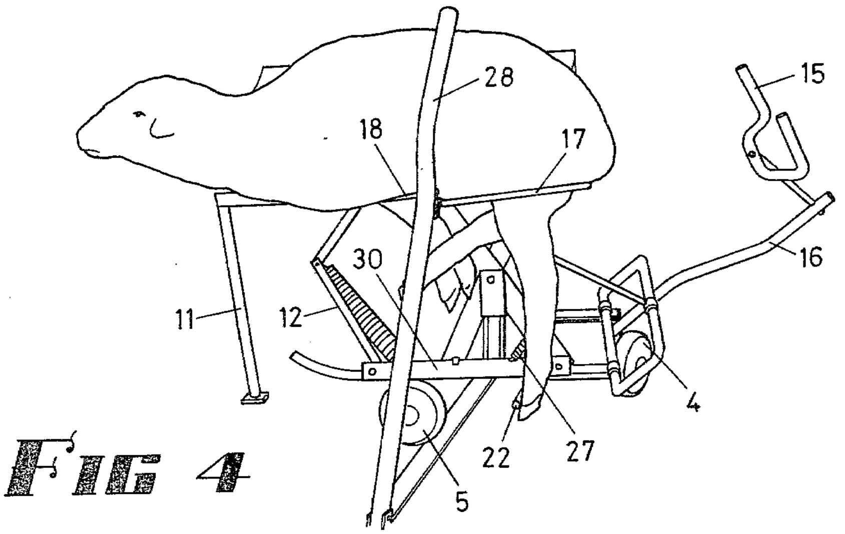

The invention will be better understood with reference to the drawings of a preferred embodiment now shown attached hereto and in which FIG. 1 is a perspective view of such a preferred embodiment shown somewhat in schematic form, FIG. 1*a* is the same view as in FIG. 1 except in this case the means to hold the four legs of the sheep are brought together on the side of the tray, FIG. 2 is a perspective view from the end of the apparatus in this case showing the situation in which a sheep is being held on its back being disabled by the member engaging against the rear legs of the sheep and the table being inclined so as to have the head of the sheep higher than the rear, FIG. 3 is a perspective view once again of the same apparatus as in FIGS. 1, 1*a* and 2, on this occasion showing a sheep now relieved of the device holding its back legs and having been rolled over having its four legs engaged by a device at the side of the table so that the sheep is now accessible over its back, and FIG. 4 is a view of the device showing a sheep in the final position before release at which stage it is accessible for removal of wool from all over its back and upon completion of any shearing action or otherwise it will be seen that the "U" shaped members can be separated so as to release the sheep and allow it to walk away.

Referring to the drawings in detail there is a table 1 supported in part by a frame 2 and constrained by an attachment of a frame member to pivot axis 3 to move around circumferential direction assisted in this by ground engaging wheels 4 and 5.

The table 1 includes an upper member 6 of arcuate upper shape arranged to hold in comfortable manner a sheep and indeed supported by pivotal supports 7 and 8 so that during a part of the operation, the upper portion of the table 6 can be inclined to assist in the general turning over of the sheep during the operation.

The end of the table 9 is first raised above the other end 10 while the sheep is on its back and then when the legs of the sheep are intended to be engaged in the "U" shaped members the end 10 is raised so as to rest on leg 11 by release of the over-centre links 12.

These are constrained by spring 13 to normally hold an over-centre position except when they are broken by operation of foot lever 14.

The means adapted to hold the back legs of the sheep when the sheep is on its back are shown at 15 this being a member that might be termed "W" shaped member which is supported by pivotally supported lever arm 16 which also has a linkage connection 17 which is arranged so that when the "W" shape member 15 is brought forward, this has the effect of raising the end of the table 9 and bringing the over-centre linkage 12 into an over-centre locking position.

The means for holding the four legs of the sheep especially when the sheep is on its side and eventually upright are shown at 17 and 18 and each of these members comprising as they do an open mouthed "U" shape member each is pivotally supported at legs 19 and 20 which are also resiliently retained so as to keep the position as shown in FIG. 1*a* in normal condition.

To assist in grabbing the four legs of the sheep, the members 17 and 18 can by reason of the support linkage 21 be held wide apart and by operation of a foot on pedal 22 this can cause arm 23 to pivot around axis 24 and to cause pivot 25 to raise in channel 26 which generally has the result as shown together with the support of resilent spring 27 of holding the "U" shaped members 17 and 18 in a close together position as shown in FIG. 1*a*.

When the sheep is in the position as shown in FIG. 4, it has been found to be of advantage to provide a further member to stop the sheep from actually struggling out of the holding position especially when the sheep is upright and for this purpose arm 28 is used which is pivotally supported around axis 29 and this is brought across in causes to lie across the top of the sheep so as to limit its movement at the critical time of being upright.

While this then describes in rather simple terms the apparatus shown, it will be appreciated that the mechanism as such may not be a most important factor in the invention as a whole.

The conceptual aspect relates to the concept of holding the four legs of the sheep and then enabling the sheep to be turned around its more or less longitudinal axis so that it can then be made available to any shearer shearing across its body and especially across its back.

The combination of some means to first of all control it wile it is on its back and then very easily and simply grasp the four legs in such a way firstly so that the sheep is not unduly antagonized and furthermore which can support the sheep in such a way that a shearer can both easily and practically obtain access for shearing purposes has meant that the concept provides very good advantage.

The various positions of the sheep will be seen by the sequence of drawings proceeding through FIG. 1*a* then to 1 in which the jaws or "U" shaped members are kept open, then FIG. 2 where the sheep is pulled onto the table from a chute as is shown in further attached drawing FIG. 5 and the member 15 is brought up to bear against the upper ends of the rear legs so that the sheep is retained in this position.

After this, the member 15 is withdrawn which in turn lowers the table end 9 and the sheep at the same time is pulled over so that its legs are then gripped by the operation of bringing members 18 and 17 together as is shown in FIG. 3.

At this stage the shearer can shear most of the side and back of the sheep and then the sheep is rolled over further still being retained by the "U" shaped members 17 and 18 as is shown in FIG. 4 with the additional assistance if felt necessary of member 28 and then eventually downward pressure is applied to lever arm 30 which releases the interlocking arrangement 21 which then allows the jaws 17 and 18 to separate and the sheep is able then to extricate itself and become free of the equipment.

The invention could reside in a concept in which the sheep is held by the jaws which are brought together in which are supported in such a way as to allow the sheep to be rotated while held and may include the addition of some tray or additional support to assist in supporting the sheep during this action.

I claim:

1. Apparatus for handling of sheep including the restraining of sheep for purposes such as shearing including a frame, a table positioned on said frame and adapted to support a sheep in a first instance on its back and subsequently in a position where the sheep is rolled over to its side while still being supported by the table and finally being fully supported in an upright position to a side of the table, an open ended yoke means adapted when the sheep is on the table on its back to push the rear legs jointly of the sheep while on its back at a location at the upper position of the legs forwardly into its body to such an extent as to restrain its movements while at such position, said yoke means being on said frame adjacent an end of said table, being spaced from said table in its normal inoperative position, and being open at its portion closest to said table, and means located at a side of the table and movably positioned to be adapted to engage jointly both front the rear legs at or about the upper end and hold these by engagement close to the body of the sheep and adapted so that the sheep while being maintained in the condition of having its legs held, can nonetheless be turned over so as to be upright although restrained by its holding of the legs.

2. Apparatus as in claim 1, wherein said last named means includes a pair of movable members each having a fixed shaped hook end for engaging a sheeps legs, which members are unitarily movable.

3. Apparatus for handling of sheep including the restraining of sheep for purposes such as shearing characterised by including a frame, a table supported on the frame and adapted to support a sheep in a prone situation on the table, a yoke adjustably supported relative to the table and adapted to selectively engage against a rear of the sheep when it is lying on its back on a table so as to push against the sheep jointly across its rear legs adjacent the body of the sheep, and, to one side of the table, two members, each with an end portion defining a "U" shaped space, the open end of one "U" shaped space being adjacent the open end of the other "U" shaped space, the location of each "U" shaped space being such that each will engage respectively and jointly the front legs or in the other case the rear legs of the sheep, at a location generally at an upper end of each leg and the body of the animal, the said two members being adjustably supported relative to the table so that in one position, the legs of the animal will be held with the animal on its side lying on the table, and, in a second position, the animal will be supported in an upright position with its legs being held.

4. Apparatus for the handling of sheep as in claim 3 in which the said two members are supported in such a way as to be separable sufficient to allow a sheep to be released from its holding position while being held in the upright condition thereby.

5. Apparatus for the handling of sheep as in claims 1, 3 or 4 in which the table is supported relative to the frame by means enabling it to be inclined relative to the horizontal whereby to provide an inclined support for a sheep with the head higher than the rear portion when this is against the said yoke.

6. Apparatus for the handling of sheep as in claims 1, 3 or 4, in which the two said members are each pivotally supported at one side adjacent the side of the table.

* * * * *